Nov. 29, 1955   S. H. EDGE ET AL   2,725,073
TIMING VALVE
Filed March 14, 1951
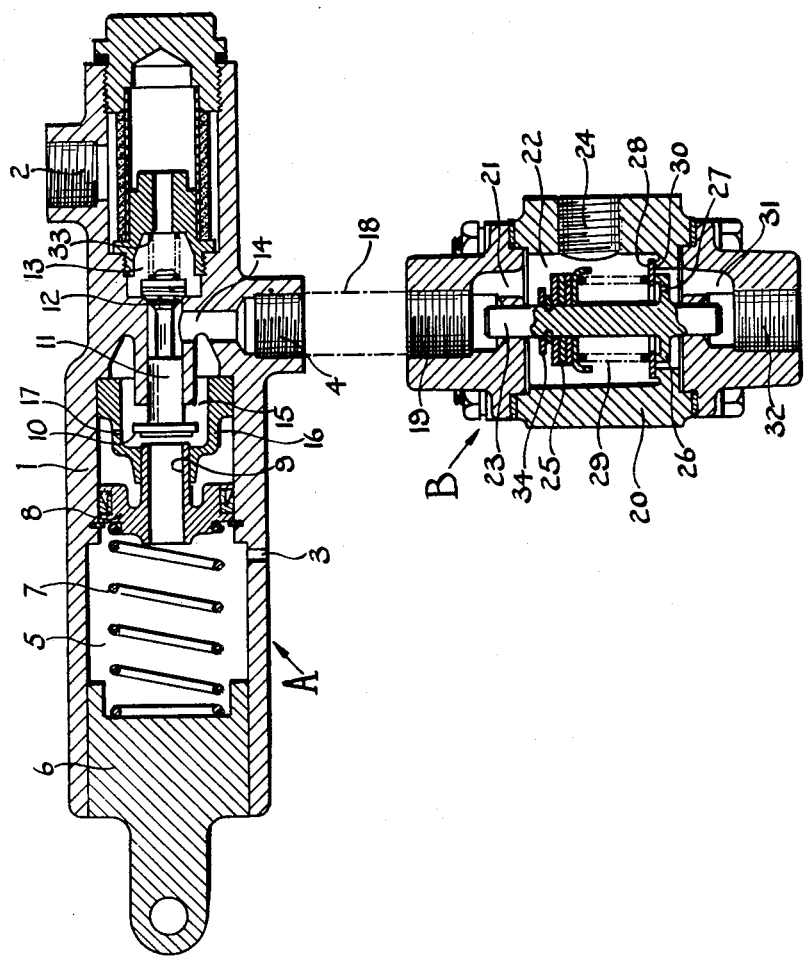
Inventors
Stanley Howard Edge
Harold Jeffery
By
Attorneys.

United States Patent Office 2,725,073
Patented Nov. 29, 1955

2,725,073
TIMING VALVE

Stanley Howard Edge and Harold Jeffery, Lincoln, England, assignors to Clayton Dewandre Company Limited, Lincoln, England Application March 14, 1951, Serial No. 215,494

Claims priority, application Great Britain April 4, 1950

1 Claim. (Cl. 137—493.4)

This invention relates to valve devices for use in controlling the braking of tractor and trailer vehicles and has for its object to provide an improved construction or arrangement designed to avoid the difficulty frequently experienced hitherto that where a common brake actuator is employed for compressed air brake application on coupled tractor and trailer vehicles, the tractor is liable to be braked first with the result of damage due to overrunning by the trailer vehicle.

According to the present invention a control valve mechanism for use in a compressed air braking system applicable to tractor and trailer vehicles includes two separate valve devices one of which acts to place a source of compressed air in communication with the second valve which acts as a timing valve to ensure that operation of the trailer brakes occurs first whenever the brake actuator is operated.

Reference will now be made to the accompanying drawing which shows a sectional view of an arrangement according to the invention.

In the construction illustrated the arrangement for controlling the application of compresesd air to operate the brake cylinders of tractor and trailer vehicles comprises two separate valve devices A and B. The valve device A can take a number of separate known forms, and for the sake of convenience is shown as a reaction valve having a casing 1 with connections 2, 3 and 4 to a compressed air reservoir, atmosphere and the timing valve B respectively. In one end of the casing 1 is a cylinder 5 having therein a piston 6 connected to the pedal or other brake actuating device controlled by the driver of the tractor vehicle. The piston 6, when operated, compresses a spring 7 to transmit its movement to a second piston 8 embodying a hollow valve component 9 adapted to co-operate with a disc valve component 10 carried by a stem 11 which also carries at its opposite end a valve member 12, movable against a spring 33, disposed in a valve chamber 13 in free communication with the inlet 2 from the source of compressed air. On the side of the valve member 12 remote from the valve chamber 13 is a passage 14 which communicates at one end with the interior of a chamber 15 wherein the hollow and disc valve components 9 and 10 are situated and at the opposite end with the outlet 4 leading to the timing valve.

The hollow cylindrical valve member 9 is slidable in a baffle 16 having a small port 17 therein. This port while ensuring that a reaction pressure is exerted on the piston 8 prevents the piston from being forced backwards in the cylinder by a sudden inrush of compressed air when the valve member 12 is unseated. Whenever this valve member is unseated, compressed air flows through the passage 14, outlet 4 and a conduit 18 to the inlet passage 19 of the housing 20 of the timing valve B. The passage 19 communicates through ports 21 with a valve chamber 22 in which a spindle 23 is freely mounted. The valve chamber 22 is always in free communication with an outlet 24 leading to the trailer brake cylinders. Mounted on the spindle 23 is a disc assembly 25 and a valve member 26 having therein a small port 27. The valve member 26 is normally held in the position shown in contact with an annular disc 28 by a spring 29. The load of the spring is self-contained in the spindle-valve assembly and the annular disc 28 is held on an annular seat 30 by the air pressure. The valve chamber 22 also has ports 31 on the outer side of the valve member 26 which communicate with an outlet 32 leading to the tractor brake cylinders. The number of components in the disc assembly 25 can be varied according to the pressure required in the spring 29. The spindle 23 is free to move axially within the limits imposed by a collar 34 and the valve member 26.

In the operation of the arrangement above described, the engagement of the valve members 9 and 10 and the unseating of the valve member 12 allows compressed air to flow from the reservoir through passages 14 and 18 into the valve chamber 22 and thence through outlet 24 to the trailer brake cylinders. The air pressure, however, forces the valve assembly and spindle 23 downwardly and, if the brake actuation is being gradually applied, compressed air flows to the tractor brake cylinders through the small port 27. Owing to the restriction imposed by the size of this port there is a delay in applying the tractor brakes and the trailer brakes are applied first.

If the braking actuation is rapid, the pressure build-up in the valve chamber 22 is great enough to lift the valve member 26 from its seating on the annular disc 28 by overcoming the load imposed by the spring 29. This operation overcomes the obstacle which the port 27 would impose in an emergency brake application, although the trailer brakes would still come into operation before the tractor brakes.

When the brakes are released, the trailer brake cylinders are exhausted through ports 24, 21 and conduit 18 and then through the housing of the control valve A. The release of the tractor brake cylinders is unrestricted since the spindle 23 and the assembly carried thereby moves away completely from the seating 30 thereby opening an unrestricted exhaust passage from the trailer brake cylinders.

We claim:

A fluid pressure timing valve, comprising a casing having a valve chamber therein provided with an inlet and first and second outlets, said inlet having free communication with said first outlet, a valve seat in the casing interposed between said inlet and said second outlet, a valve stem freely slidable within the casing and extending through said valve seat, an annular valve disc having a central opening therein and freely surrounding said stem and movable into seated relation with said valve seat in response to admission of fluid pressure to the valve chamber but movable into unseated relation with said valve seat in response to exhausting of fluid pressure from the valve chamber, an annular valve member formed on said stem and arranged to seat against said annular valve disc around the opening therein and having a port which provides restricted communication between the valve chamber and said second outlet through the central opening in the annular valve disc, and a spring interposed between said annular valve disc and the stem and acting to hold said valve disc and annular valve member in seated relation but yieldable in response to a sudden increase in fluid pressure in the valve chamber to unseat the annular valve member from the valve disc but to hold the latter seated on the valve seat in the casing, and said spring being yieldable in response to fluid pressure in said second outlet which exceeds the fluid pressure in the valve chamber to unseat the annular valve disc from the valve seat in the casing.

References Cited in the file of this patent
UNITED STATES PATENTS

| | | |
|---|---|---|
| 2,161,642 | Stroup | June 6, 1939 |
| 2,269,054 | Fitch | Jan. 6, 1942 |
| 2,275,255 | Freeman | Mar. 3, 1942 |
| 2,393,589 | Compton et al. | Jan. 29, 1946 |
| 2,433,302 | Snyder | Dec. 23, 1947 |